United States Patent [19]

Bringhurst et al.

[11] 4,387,642
[45] Jun. 14, 1983

[54] BI-DIRECTIONAL, CONSTANT VELOCITY, CARRIAGE SHUTTLING MECHANISMS

[75] Inventors: Edward D. Bringhurst, Seattle; Swend L. Miller, Kent, both of Wash.

[73] Assignee: Mannesmann Tally Corporation, Kent, Wash.

[21] Appl. No.: 169,595

[22] Filed: Jul. 17, 1980

[51] Int. Cl.³ .............................................. B41J 5/08
[52] U.S. Cl. .................................. 101/93.04; 400/124
[58] Field of Search ............... 400/124, 126, 320, 322, 400/323, 335; 101/93.04, 93.05, 292, 316; 74/27; 346/139 R

[56] References Cited

U.S. PATENT DOCUMENTS

| | | | |
|---|---|---|---|
| 895,820 | 8/1908 | Whitlock | 74/27 |
| 1,137,383 | 4/1915 | Colburn | 74/27 X |
| 2,356,156 | 8/1944 | Golber | 74/27 |
| 2,403,760 | 7/1946 | Seybold | 74/27 |
| 2,938,455 | 5/1960 | Jurgens et al. | 101/93.05 |
| 3,429,414 | 2/1969 | Bradbury | 400/322 X |
| 3,742,846 | 7/1973 | Knappe | 400/124 X |
| 3,768,403 | 10/1973 | Rose | 101/93.04 |
| 3,782,278 | 1/1974 | Barnett et al. | 101/93.04 |
| 3,802,544 | 4/1974 | Howard et al. | 400/124 |
| 3,833,891 | 9/1974 | Howard et al. | 101/93.05 X |
| 3,941,051 | 3/1976 | Barrus et al. | 101/93.04 |
| 3,986,594 | 10/1976 | Kondur, Jr. | 400/320 X |
| 4,061,219 | 12/1977 | Nishikawa | 400/124 |
| 4,062,436 | 12/1977 | Kondur, Jr. | 400/124 |
| 4,151,447 | 4/1979 | Von Der Heide et al. | 400/322 X |
| 4,239,403 | 12/1980 | Matula et al. | 400/322 |
| 4,278,019 | 7/1981 | Meier | 101/93.04 |

FOREIGN PATENT DOCUMENTS

| | | | |
|---|---|---|---|
| 55-28815 | 2/1980 | Japan | 400/320 |
| 55-61483 | 5/1980 | Japan | 101/93.05 |
| 2029770 | 3/1980 | United Kingdom | 101/93.05 |

OTHER PUBLICATIONS

Osbert H. Nichols "The Design of Elliptical Wheels for a Constant Speed Reciprocating Motion-II" *Machinery*, Sep. 22, 1921, pp. 754–756.

Theodore Bernett, "Elliptical Gears for Irregular Motion" *Mechanical Engineering*, Jun. 1967, pp. 33–39.

IBM Technical Disclosure Bulletin, "Matrix Scan Printing Method", Pivnichny, vol. 21, No. 1, Jun. 1978, pp. 103–104.

*Primary Examiner*—Ernest T. Wright, Jr.
*Attorney, Agent, or Firm*—Christensen, O'Connor, Johnson & Kindness

[57] ABSTRACT

Bi-directional, constant velocity, carriage shuttling mechanisms particularly suitable for use in dot matrix line printers, are disclosed. The carriage shuttling mechanisms comprise a pair of identically sized bi-lobed, second order elliptical gears (41, 45) connected together in a 90° phase relationship either directly or via a belt. One of the bi-lobed gears is rotated at a constant velocity and the other is eccentrically linked (47) to the carriage (11) to be bi-directionally shuttled at a constant velocity.

32 Claims, 9 Drawing Figures

BI-DIRECTIONAL, CONSTANT VELOCITY, CARRIAGE SHUTTLING MECHANISMS

TECHNICAL AREA

This invention relates to carriage shuttling mechanisms and, in particular, mechanisms for bi-directionally shuttling the carriage of dot matrix line printers at a constant velocity.

BACKGROUND OF THE INVENTION

Various types of dot matrix line printers have been proposed and are in use. In general, dot matrix line printers include a plurality of dot forming elements having their dot printing ends lying along a line that is orthogonal to the direction of paper movement through the printer. Since paper movement is normally vertical, the dot printing ends usually lie along a horizontal line. Located on the side of the paper remote from the dot forming elements is a platen and located between the dot forming elements and the paper is a ribbon. During printing, the dot forming elements are oscillated back and forth along the horizontal line that they define. At predetermined positions, as required by the image or characters to be formed, the dot forming elements are actuated to create a dot. A series of thusly formed dot rows creates a row of characters. The paper, of course, is incremented forwardly at the end of each dot row. While the present invention was developed for use in dot matrix line printers to shuttle or oscillate the dot forming elements and, thus, finds its primary use in this area, it is to be understood that the invention can be used to shuttle carriages of other mechanisms, including other printer mechanisms, particularly those mechanisms requiring or desiring constant velocity shuttling.

In general dot matrix line printers fall into two categories. In the first category are dot matrix line printers wherein only the dot forming elements are oscillated. In the second catagory are dot matrix line printers wherein the actuating mechanism as well as the dot forming elements are oscillated. Regardless of the type, the portion of the printing mechanism to be oscillated is mounted on a carriage and the carriage is oscillated by a shuttling mechanism. Since the present invention is directed to carriage shuttling mechanisms, it is useful with both catagories of dot matrix line printers.

In the past, various types of carriage shuttling mechanisms have been proposed for use in dot matrix line printers. One such type of carriage shuttling mechanism includes a stepping motor that is actuated to cause step increments of carriage movement. At the end of each step, the appropriate actuators are energized to create dots. Thereafter, the carriage is stepped and the appropriate actuators energized to create further dots. Bi-directional movement is provided by stepping the crriage first in one direction and then in the opposite direction.

One major problem attendant to the use of stepping motors in dot matrix line printers is the speed limitation that they place on the rate of printing. As a result of this limitation, attempts have been made to utilize other types of motors, such as constant speed DC motors. One of the problems with the use of constant speed DC motors is that the prior art mechanisms for coupling the shafts of such motors to the printer carriages have produced variable carriage velocity. As a result, prior art carriage shuttling mechanisms using constant speed motors require that the position of the carriage be constantly determined and the position information utilized to synchronize the energization of the print element actuators. If such synchronization is not provided, precise position repeatability of print element actuators is not provided, whereby printed characters and images are distorted and/or blurred. Distorted and/or blurred images, of course, are unacceptable in environments where high quality printing is required or desired. More specifically, in order to produce high quality printing, it is necessary for a dot matrix line printer to be able to precisely position dots at the same position in each dot line. If this result cannot be accomplished, the resulting images and characters are blurred and/or distorted in some other manner. Stepping motor carriage movement mechanisms, of course, provide the desired dot position repeatability. However, as noted above, such carriage shuttling mechanisms are slow and, therefore, undesirable. While movement mechanisms utilizing constant speed DC motors (or other constant speed motors) are substantially faster, they have the disadvantage of producing a nonlinear carriage displacement versus time curve (albeit oscillatory), whereby relatively expensive position sensing and/or control circuits are required in order to precisely control dot position. In some systems a precise position sensor is required. In other systems (where the shape of the displacement versus time curve is known and repeatable) a position sensor is not needed. In the latter case, the electronic timing for dot printing can be varied to accommodate the variable dot-to-dot displacement timing, provided the printing dynamics allow dot printing at the shortest dot-to-dot times available. In other words the shortest dot-to-dot displacement time, based on printing dynamics, limits the speed of such systems during the longer dot-to-dot periods as well as the short dot-to-dot periods. As a result overall speed is less than it could be if dot-to-dot displacement time were constant. Obviously, it would be desirable to provide a carriage shuttling mechanism that is substantially faster than stepping motor type carriage shuttling mechanisms yet does not require relatively expensive position sensing mechanisms and control systems adapted to compensate for variable carriage movement velocity.

Therefore, it is an object of this invention to provide new and improved carriage shuttling mechanisms.

It is also an object of this invention to provide new and improved carriage shuttling mechanisms for dot matrix line printers.

It is another object of this invention to provide new and improved carriage shuttling mechanisms for dot matrix line printers that provide constant velocity carriage shuttling movement in the region where dots are to be printed.

It is a still further object of this invention to provide bi-directional, constant velocity, carriage shuttling mechanisms for dot matrix line printers.

SUMMARY OF THE INVENTION

In accordance with this invention bi-directional, constant velocity, carriage shuttling mechanisms ideally suited for use in dot matrix line printers are provided. Carriage shuttling mechanisms formed in accordance with the invention comprise a pair of identically sized, bi-lobed, second order elliptical gears connected together in a 90 degree phase relationship either directly or via a coupling medium, such as a belt. One of the bi-lobed gears is rotated at a constant velocity and the other is eccentrically linked to the carriage to be bi-directionally shuttled at a constant velocity.

Preferably, a sensing mechanism is provided for sensing when the carriage is at the ends of its constant velocity range of movement and producing a synchronizing pulse that is used to control the start of dot forming element actuator energization for each line of printing.

In addition, preferably, in the belt coupled embodiment both the bi-lobed, elliptical gears and the belt have an even number of teeth.

It will be appreciated from the foregoing description that the invention provides an uncomplicated shuttling mechanism for oscillating a carriage, such as the carriage of a dot matrix line printer. Rather than providing constantly changing velocity carriage movement over the printing range, as is provided by prior art mechanisms that directly couple a constant speed motor to the carriage, the carriage shuttling mechanism of the invention provides constant velocity of movement over the range of printing.

BRIEF DESCRIPTION OF THE DRAWING

The foregoing objects and many of the attendant advantages of this invention will become more readily appreciated as the same becomes better understood by reference to the following detailed description when taken in conjunction with the accompanying drawing wherein.

DESCRIPTION OF THE PREFERRED EMBODIMENTS

Prior to describing the preferred embodiments of the invention, a brief discussion of the nature and operation of one type of dot matrix line printer is set forth. In this regard, attention is directed to FIG. 1, which illustrates selected components of a dot matrix line printer including a carriage 11. The carriage 11 includes a base member 13 that supports a plurality of vertically arrayed tine like print hammers 15. The print hammers 15 have a common base via which they are attached to the base member 13 of the carriage 11. The other ends of the print hammers 15 are free to move back and forth in the manner hereinafter described.

Figure 3:
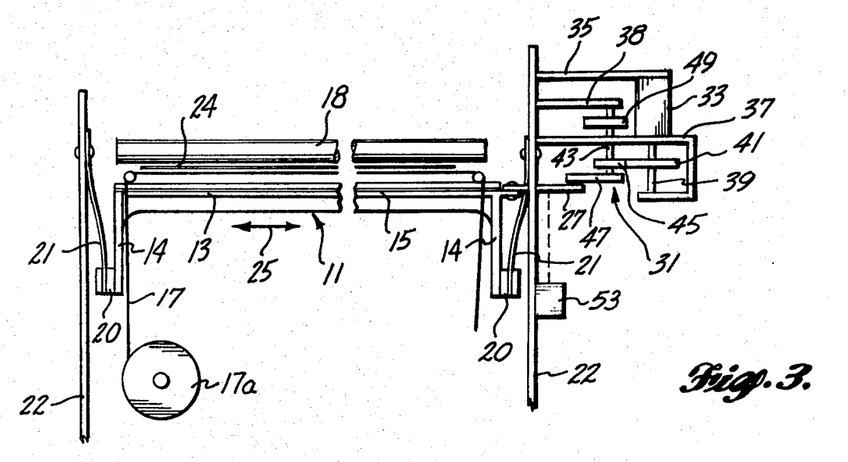
FIG. 3 is a pictorial view of a preferred embodiment of the invention connected to the carriage of a dot matrix line printer of the type illustrated in FIG. 1.

Located on one side of the movable ends of each of the print hammers 15 is a dot printing anvil (not shown). Located on the other side of the tips of the hammers 15 are print hammer actuators (not shown). The print hammer actuators include magnetic circuits (also not shown) that draw the print hammers 15 away from their quiescent position and, upon command, release the hammers 15. Alternatively, the commands may cause the hammers 15 to be both drawn away and released. Various types of magnetic circuits employing combinations of permanent and electromagnetic arrangements have been used in the past to create such hammer actuation. Regardless of how implemented, releasing a hammer 15 causes a dot to be printed by the hammer's anvil pressing a ribbon 17, which travels between take-up and supply reels 17a and 17b, against a print receiving medium, e.g., paper 24 (FIG. 3). The print receiving medium is backed up by a platen 18. The platen 18, paper 24 and ribbon 17, of course, are all aligned with one another in a conventional manner.

Details of dot printing anvils and print hammer actuators of one form of a dot matrix line printer of the general type herein described are contained in U.S. Pat. No. 3,768,403 entitled "High Speed Printer With Leaflike Impact Means" by Stanley E. Rose and U.S. Pat. No. 3,782,278, entitled "Impact Line Printer" by David L. Barnett, et al.

Figure 1:
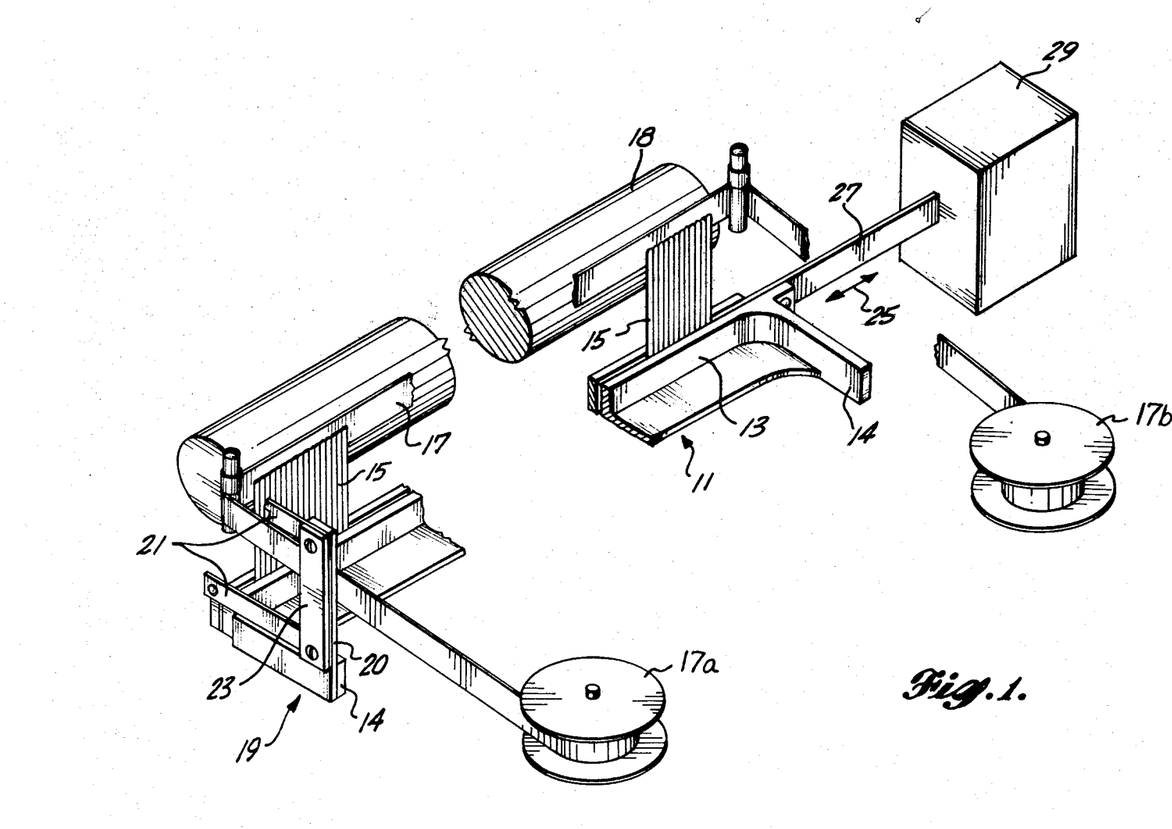
FIG. 1 is a pictorial view of selected components of a dot matrix line printer.

Illustrated on the left side of FIG. 1 is a flexure assembly 19 adapted to support one end of the carriage 11. More specifically, the flexure assembly 19 includes a vertical post 20 connected to an arm 14 that extends rearwardly from the base member 13 of the carriage 11. One end of each one of a pair of flexures 21 are attached to the post 20. One flexure 21 is located near the top of the post 20 and the other is located near the bottom of the post 20. A support plate 23 overlies the ends of the flexures 21 attached to the post 20 to rigidize the attachment. The other ends of the flexures 21 are attached to the housing (not shown) of the printer (not shown in FIG. 1). A similar flexure assembly supports the right side of the carriage 11. For purposes of clarity of illustration, the latter flexure assembly is not shown in FIG. 1.

As a result of the foregoing flexure support arrangement, the carriage 11 is free to move horizontally back and forth in the direction illustrated by the double headed arrow 25. The carriage movement force is produced by an oscillating movement mechanism 29 illustrated in block form in FIG. 1. The oscillating movement mechanism 29 is coupled to the carriage 11 by a horizontal arm 27 affixed to one end of the base member 13. As the oscillating movement mechanism 29 moves the arm 27 back and forth in the direction of the arrow 25, the carriage 11 is moved back and forth, i.e., oscillated. As the carriage 11 is oscillated, the hammers 15 are selectively withdrawn and/or released (actuated) to create dots at predetermined positions on the paper 24. Each time the carriage 11 reaches the end of its path of travel in one direction or the other, the paper 24 is stepped. Thus, as the hammers 15 are oscillated, rows of dots at predetermined positions are created. A series of dot rows creates a row of characters (or an image). After a row of character dot rows have been printed, the paper 24 is incremented by the desired amount of character row spacing and the first dot row of the next character row is printed.

In the past, the carriages of many dot matrix line printers have been oscillated by stepping motors. One of the primary disadvantages of using stepping motors is the limitation they place on oscillation speed and, thus, on print speed. Attempts to overcome the print speed problem include replacing the stepping motors with constant speed motors, such as constant speed DC motors. While overcoming the oscillation speed problem, the constant speed motor solution has created other problems. Specifically, in the past, the coupling systems connecting the shafts of constant speed motors to the printer carriage have resulted in variable carriage oscillation velocity. As a result, the carriage displacement versus time curve has been nonlinear. Nonlinearity in the printing regions has created the requirement that such systems either: include sensors for continuously sensing the position of the printer carriage and, in accordance therewith, provide synchronizing pulses for controlling the energization of the print hammer actuators; or, have a displacement versus time curve that is known and repeatable and, thus, can be used to control dot-to-dot timing. In the latter case, of course, dot-to-dot timing, of course, is the shortest dot-to-dot time allowable commensurate with printing dynamics. This shortest dot-to-dot time limitation limits print speed when longer dot-to-dot time is available. In summary, in the past, sensors and/or complex electronic control systems have been required in constant speed motor carriage movement mechanisms to synchronize dot printing with carriage position at each print position in order to obtain high print quality. In the absence of such systems, the printed images are blurred and, often, vertically skewed. Such images are, of course, unacceptable in most printer environments.

Figure 2:
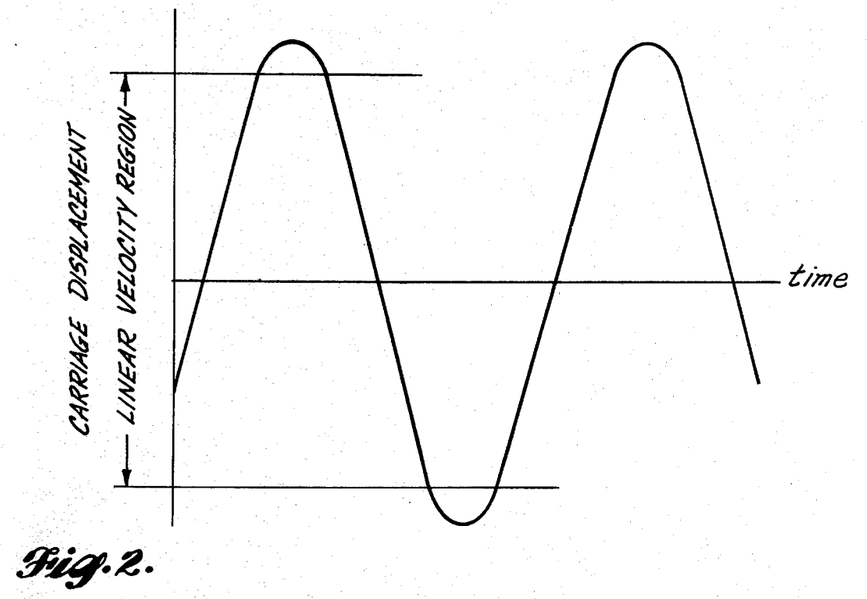
FIG. 2 is a carriage displacement waveform that is produced when the carriage of a dot matrix line printer is oscillated at a linear velocity over the range of printing.

In the past, oscillatory carriage displacement produced by constant speed motors has had a true sinusoidal waveform, showing that the velocity of movement is continuously changing. It is this continuously changing, i.e., nonlinear waveform, that has created the need for sensors and/or print synchronizing electronic circuits. The present invention is directed to providing mechanical systems that create an oscillatory carriage displacement waveform having a generally triangular shape. That is, the carriage displacement waveform includes linearly changing regions denoting that the carriage is moving at a constant velocity. Printing occurs in the constant velocity regions. As a result, complicated sensing and synchronizing control systems are not required. An example of a carriage displacement waveform created by a bi-directional, constant velocity, carriage shuttling mechanism formed in accordance with the invention is illustrated in FIG. 2. More specifically, FIG. 2 is a waveform diagram showing time on the horizontal axis and carriage displacement on the vertical axis. As shown carriage displacement changes are linear over a substantial portion of a total cycle of the waveform. Only the tips of the waveform, during which carriage reversal occurs, are nonlinear. As a result, the waveform is generally triangular shaped.

FIG. 3 illustrates a dot matrix line printer carriage 11 moved by a bi-directional, constant velocity, carriage shuttling, mechanism 31 formed in accordance with the invention. For purposes of ease of understanding, as with FIG. 1, only a portion of the dot matrix line printer mechanism, namely the carriage 11 and its support structure, are illustrated in FIG. 3. Further, the portion of the dot matrix line printer mechanism illustrated in FIG. 3 is the same as the portion of the dot matrix line printer mechanism illustrated in FIG. 1. Thus, the dot printer mechanism illustrated in FIG. 3 includes the carriage 11, which comprises the base member 13 attached via vertical posts 20 and flexures 21 to the frame 22 of the printer. Vertically oriented hammers 15 are mounted on the base member 13 of the carriage 11 such that their anvils are aligned with the ribbon 17. A paper or other print receiving medium 24 lies between the ribbon 17 and the platen 18 of the printer. The horizontal arm 27, attached to one end of the carriage base member 13, connects the carriage 11 to the bi-directional, constant velocity, carriage shuttling mechanism 31.

The bi-directional, constant velocity, carriage shuttling mechanism 31 includes a constant speed (preferably DC) motor 33, supported by suitable frame members 35 and 37 such that the shaft 39 of the motor 33 is horizontally oriented and orthogonal to the axis of movement of the carriage 11. Mounted on the shaft 39 of the motor 33 is a first bi-lobed, second order elliptical gear 41. Mounted on a driven shaft 43 is a second, similarly sized, bi-lobed, second order elliptical gear 45. The driven shaft 43 lies parallel to the shaft 39 of the constant speed motor 33 and is rotatably mounted in suitable frame members 37 and 38. The first and second bi-lobed, second order elliptical gears 41 and 45 are either directly coupled together or coupled together via a belt, as hereinafter described in more detail. In any event, rotation of the first gear 41 causes rotation of the second gear 45. The second gear 45 is eccentrically connected via a connecting link 47 to the arm 27 affixed to one end of the carriage 11. As a result, when the second gear 45 is rotated, the carriage 11 is oscillated back and forth in the direction of the double headed arrow 25.

In order to reduce the vibration caused by unbalanced carriage oscillation, a compensating mass 49 is mounted on the same shaft 43 as the second gear 45.

Figure 4:
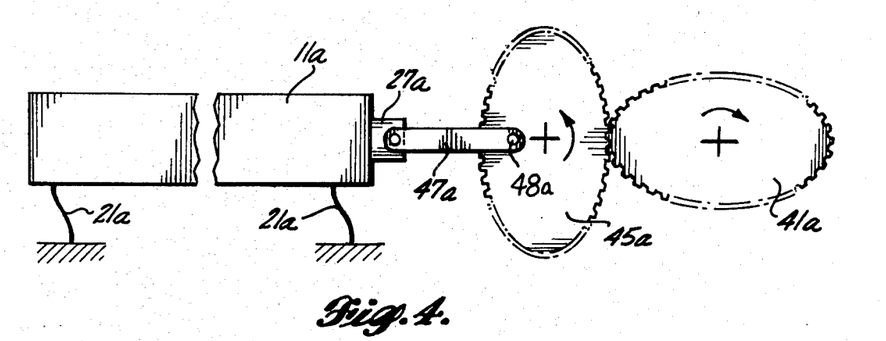
FIG. 4 is a pictorial view of the major components of one embodiment of a bi-directional, constant velocity, carriage shuttling mechanism formed in accordance with the invention.

FIG. 4 is a schematic diagram illustrating direct coupling between a first bi-lobed, second order elliptical gear 41a and a second, similarly sized, bi-lobed, second order elliptical gear 45a. The second bi-lobed gear 45a is connected by a connecting link 47a to an arm 27a attached to one end of a carriage 11a, which is supported by a pair of flexures 21a. The connecting link 47a is pivotally attached at either end. The eccentric point of connection 48a of the connecting link 47a to the second bi-lobed gear 45a lies along a minor axis of that gear 45a. The major and minor axes of the two gears 41a, 45a are 90° out-of-phase with one another.

Figure 5:
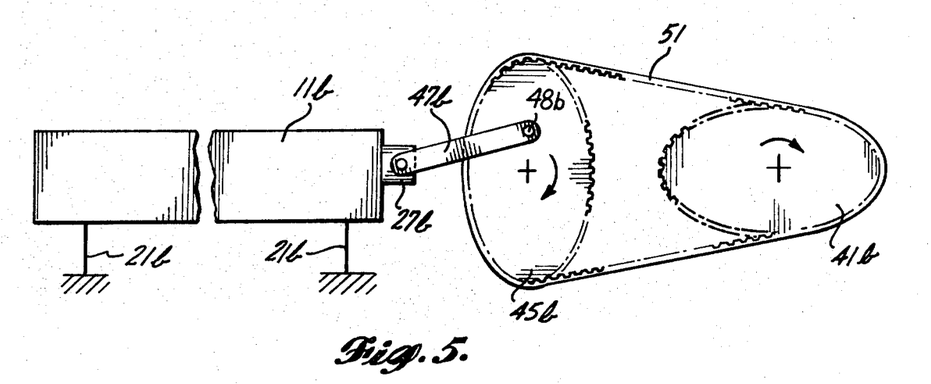
FIG. 5 is a pictorial view of the major components of an alternative embodiment of a bi-directional, constant velocity, carriage shuttling mechanism formed in accordance with the invention.

FIG. 5 illustrates an embodiment of the invention wherein a first bi-lobed, second order elliptical gear 41b is connected to a second, similarly sized, bi-lobed, second order elliptical gear 45b by a toothed belt 51. The second bi-lobed gear 45b is connected by a connecting link 47b to an arm 27b attached to one end of a carriage 11b. The carriage 11b is supported by a pair of flexures 21b. The ends of the connecting link 47b are rotatably attached to the arm 27b and to the second bi-lobed gear 45b. The eccentric point of connection 48b of the connecting link 47b to the second bi-lobed gear 45b lies along a major axis of the second bi-lobed gear 45b. As with FIG. 4, the major and minor axes of the two gears 41b and 45b illustrated in FIG. 5 are 90° out-of-phase with one another.

As noted above, the motor 33 rotating the first bi-lobed gear 41a or 41b illustrated in FIGS. 4 and 5, is a constant speed motor, whereby these gears 41a or 41b are rotated at a constant speed. However, the second bi-lobed gears 45a and 45b are not rotated at a constant speed. Yet the carriage 11a or 11b is oscillated at a constant speed (at least in the region of printing). Carriage motion follows the waveform illustrated in FIG. 2, which is more triangular than sinusoidal. This result is achieved because the gear ratio between the first and second bi-lobed gears 41a and 45a, or 41b and 45b continuously changes due to their noncircular shape. When the two identically sized bi-lobed, second order elliptical gears 41a and 45a, or 41b and 45b are of the right shape, their variable gear ratio, and hence, the relative speed and motion of the two gears 41a and 45a, or 41b and 45b can be made to fluctuate in a manner such that the displacement versus time curve of the carriage approaches a triangular shape (rather than an undesired sinusoidal wave shape). A perfect triangular carriage displacement shape would mean that the carriage is moving at a constant velocity in each direction, with instantaneous direction reversals. Such perfect motion is, of course, impossible to achieve using uncomplicated mechanical mechanisms. However, a perfect triangular displacement waveform is not required. Rather, only a constant rate of change in the region of printing is required. The invention provides this result.

As will be readily appreciated from the foregoing discussion, when one bi-lobed, second order elliptical gear running at a constant rotational speed moves a second, identically sized, bi-lobed, second order elliptical gear, the driven gear rotates at a continuously varying speed with two complete speed variations occurring per turn of the first gear. Thus, the speed of the driven gear and, hence, the eccentric connection, is a second harmonic component added to the constant input rotational speed. Thus, the rotational speed of the second gear, $\omega_2$, and, hence, the eccentric connection point is approximately defined by the following equation:

$$\omega_2 = \omega_1 + B \cos(2\omega_1 t) \tag{1}$$

where:
$\omega_1$ equals the constant speed of the first bi-lobed gear; and,
B equals the amount of speed fluctuation of the second bi-lobed gear and is determined by the shape of the gears.

(Equation (1) is in approximate representation because the speed modulation of the second gear of a bi-lobed pair is not necessarily sinusoidal.)

The following is a mathematical discussion of the operation of two identically sized, bi-lobed, second order elliptical gears connected together in the manner illustrated in FIGS. 4 and 5, i.e., 90° out-of-phase with one another. As will be readily understood from viewing FIGS. 4 and 5, 90° phase relationship is the only way these two types of gears can be oriented and remain connected together either directly or via a continuous belt having little or no stretch capability. As two gears of the type and orientation illustrated in FIGS. 4 and 5 turn, the change in the radius along a line running between the two gears is such that, as the radius of one gear increases, the radius of the other gear decreases in a compensating manner and vice versa. This result is true regardless of whether the gears are in contact (FIG. 4) or spaced apart and joined by a belt (FIG. 5). In either instance, the center-to-center distance between the two gears remains constant. If the dimensions a and b (FIG. 6) define the length of the major and minor axes of the two identically sized bi-lobed gears, the equations, in polar coordinate form that define the shape of the two gears are:

$$R_1 = \frac{2ab}{a + b - (a - b)\cos 2\theta_1} \tag{2}$$

$$R_2 = \frac{2ab}{a + b - (a - b)\cos[2(\theta_2 + \pi/2)]} \tag{3}$$

Figure 6:
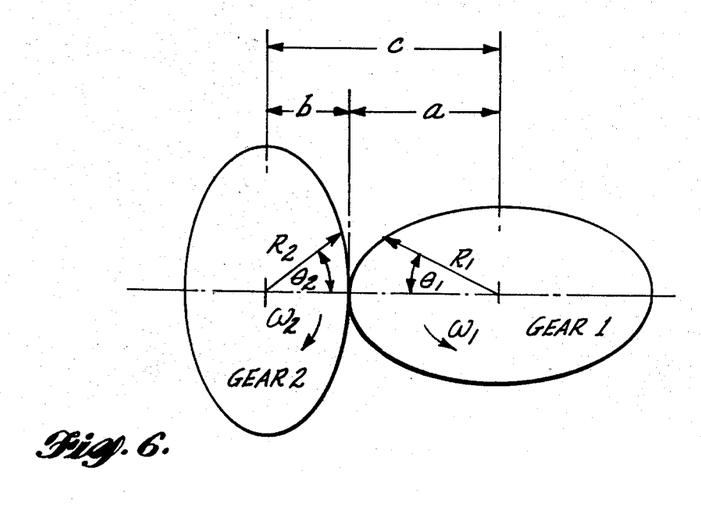
FIG. 6 is a schematic view illustrating certain mathematical terms used to describe the bi-lobed, second order elliptical gears utilized by the invention.

Since the gear center-to-center distance, c, remains constant for any point in the rotational cycle of the two gears, a definition of this distance for one position defines the distance c for all positions in the rotation cycle. Assuming the gears are in contact, as illustrated in FIGS. 6, the center-to-center distance, c, is defined as:

$$c = a + b \tag{4}$$

or:

$$R_1 + R_2 = a + b \tag{5}$$

In order for a gear train formed of a pair of identically sized bi-lobed, second order elliptical gears to have continuity of operation, the linear velocity must be the same for both gears at the point of pitch surface contact. This, or course, does not mean that the two gears necessarily have the same rotational velocity, only that the product of the radiuses to the point of contact times the angular velocity is the same for both gears. Mathematically, this necessary relationship can be expressed as:

$$\omega_1 R_1 = \omega_2 R_2 \tag{6}$$

or:

$$\omega_2/\omega_1 = R_1/R_2 \tag{7}$$

Solving Equation (5) for $R_1$ and substituting into Equation (7) developes the following equation:

$$\frac{\omega_2}{\omega_1} = \frac{a + b - R_2}{R_2} \tag{8}$$

Substituting the value of $R_2$ from Equation (3) into Equation (8) and algebraically manipulating the result develops the following equation:

$$\frac{\omega_2}{\omega_1} = \frac{(a^2 + b^2) - (a^2 - b^2)\cos[2(\theta_2 + \pi/2)]}{2ab} \tag{9}$$

A working ratio, r, for the two gears can be defined as the ratio of the maximum gear radius to the minimum gear radius. Thus, mathematically, r is defined as:

$$r = a/b \tag{10}$$

When Equation (9) is divided by $b^2$ and the value of r from Equation (10) is substituted for all occurrences of a/b, the following equation results:

$$\frac{\omega_2}{\omega_1} = \frac{(r^2 + 1) - (r^2 - 1)\cos[2(\theta_2 + \pi/2)]}{2r} \tag{11}$$

Equation (11) defines the angular velocity of the second bi-lobed gear in terms of its angular position and the rotational speed, $\omega_1$, of the first bi-lobed gear. As noted above, $\omega_1$, is a constant.

The angular velocity ratio of the two bi-lobed gears in terms of the angular position of the first bi-lobed gear is derived in a similar manner and is given by the following equations:

$$\frac{\omega_2}{\omega_1} = \frac{2r}{(r^2 + 1) + (1 - r^2) \cos 2\theta_1} \quad (12)$$

or:

$$\omega_2 = \frac{2r \omega_1}{(r^2 + 1) + (1 - r^2) \cos 2\theta_1} \quad (13)$$

Figure 7:
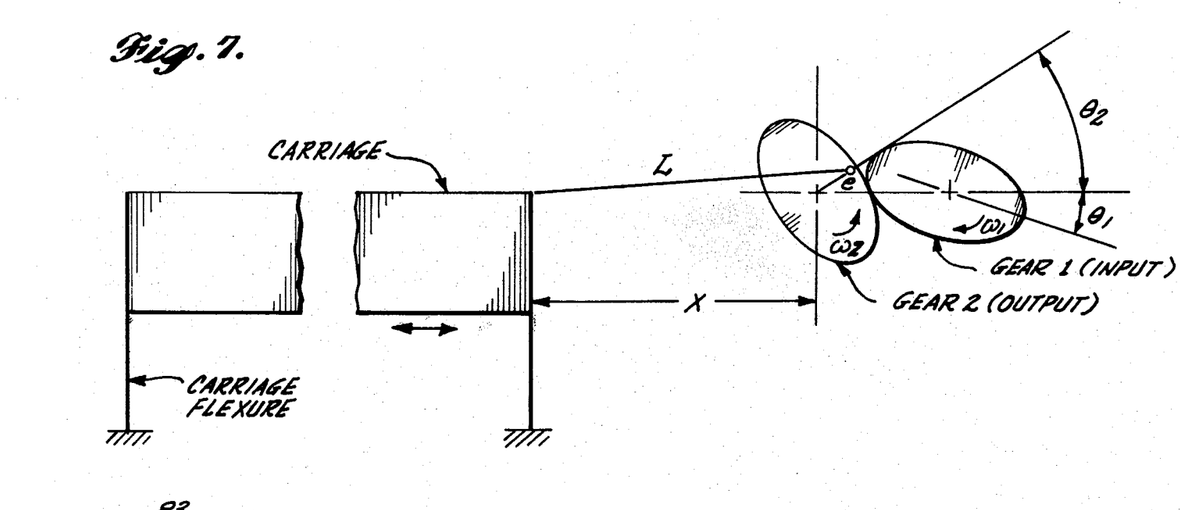
FIG. 7 is a pictorial view illustrating other mathematical terms used to describe the bi-lobed, second order elliptical gears and the connecting mechanism for eccentrically linking one of the bi-lobed gears to a carriage, in accordance with the invention.

Referring now to FIG. 7, it is readily apparent that in order to determine carriage position versus time, it is necessary to know the length of the connecting link connecting the second bi-lobed gear to the carriage, L; the eccentric distance between the point of attachment of the link to the second bi-lobed gear and the center of rotation of the second bi-lobed gear, e; and, the angle between a reference line running between the center of rotation of the first and second bi-lobed gears and the eccentric, with respect to time, $\theta_2$. Since $\omega_2$ is not a constant, determining $\theta_2$ requires the integration of Equation (13). That is:

$$\theta_2 = \int_0^t \omega_2 \, dt \quad (14)$$

or:

$$\theta_2 = \int_0^t \frac{2r \omega_1 dt}{(r^2 + 1) + (1 - r^2) \cos 2\theta_1} \quad (15)$$

Since $\omega_1$ is a constant, the angual position of the first gear with respect to time, $\theta_1$, is equal to $\omega_1 t$. Consequently, Equation (15) can be changed to:

$$\theta_2 = \int_0^t \frac{2r \omega_1 dt}{(r^2 + 1) + (1 - r^2) \cos (2 \omega_1 t)} \quad (16)$$

Integrating and manipulating the resulting terms of Equation (16) results in the following equation being developed:

$$\theta_2 = \text{Tan}^{-1}[r \, \text{Tan} (\omega_1 t)] \quad (17)$$

The position of the carriage X at any point in time is defined by the equation:

$$X = L - e \cos \theta_2 \quad (18)$$

Substituting the value of $\theta_2$ determined in Equation (17) into Equation (18) results in the following equation being developed:

$$X = L - e \cos \{\text{Tan}^{-1}[r \, \text{Tan} (\omega_1 t)]\} \quad (19)$$

The velocity of the carriage $V_X$ *is the time derivative of Equation* (19) and the velocity of the carriage versus the angular position of the output gear is defined by the following equation:

$$V_X = \frac{e \, \omega_1 \sin \theta_2}{2r} \{(r^2 + 1) - (r^2 - 1) \cos [2 (\theta_2 + \pi/2)]\} \quad (20)$$

Equations (19) and (20) and the constant values for $\omega_1$, e, L, can be used to evaluate any bi-lobed gear pair having specified values for a and b to determine how it will perform in a carriage shuttling mechanism formed in accordance with the invention. That is, these items can be used to evaluate how close a particular pair of identically sized, bi-lobed, second order elliptical gears will come to creating a carriage displacement versus time plot of the type illustrated in FIG. 2. While various a and b values can be chosen, by way of example, in one actual embodiment of the invention, an a factor equal to 1.007 and a b factor equal to 0.7688 were used. A total oscillation sweep distance of 0.0538 inches set e equal to 0.0269 inches; and, $\omega_1$ was set equal to 300 revolutions per minute. This mechanism was used to oscillate a printer mechanism of the type utilized in the T2000 printer produced by the Talley Corporation, Kent, Wash. This particular bi-lobed gear arrangement was chosen because it produces a reasonably long period during which very little change in carriage velocity occurs. Because a relatively long period of nearly constant velocity was provided, the displacement versus time curve of carriage motion was quite linear, i.e., straight sided, over most of the motion cycle. In other words, a carriage motion waveform similar to that illustrated in FIG. 2 was created.

While the connecting link 47,47a or 47b illustrated in FIGS. 3, 4 and 5 is shown as rigid, if desired, the connecting link can be formed of two spring flexures (not shown) connecting the eccentric point 48a or 48b on the second gear 45, 45a or 45b to the arm 27, 27a or 27b extending outwardly from the carriage 11, 11a or 11b. The flexure coupling has the advantage of requiring a bearing at one end of the connecting link only.

As noted above, because carriage movement is linear and because the carriage 11 is mechanically coupled to its prime mover, the invention does not require a position sensor for continuously sensing the position of the carriage 11 in order to synchronize the operation of the print hammers 15. While continuous carriage position sensing is not required, a position sensor for sensing the extreme sideways positions of the carriage 11, or the beginning of the linear regions during which printing is to occur, is desirable. A position sensor 53 mounted on the printer frame is schematic illustrated in FIG. 3. The sensor 53 may be an optical sensor, a magnetic sensor or any other suitable sensor adapted to produce a pulse output each time the carriage 11 achieves one or the other of its extreme positions. If desired, a single pulse may be produced at one end of the path of travel of the movement of the carriage 11 and two closely spaced pulses produced at the other end in order to identify the two extreme sideways positions of the carriage 11.

While the carriage 11 can be moved at its natural resonant frequency, preferably, it is moved at a nonresonant frequency. In this regard, it will be appreciated that when a spring mass system, such as a flexure mounted carriage 11, is driven in its natural resonant frequency, the magnitude of the carriage oscillation force tends to build up. If the system is mechanically constrained, such as by flexures 21, the force that the constraining structure experiences is dramatically increased as a result of the oscillation force build up tendency. In the case of a printer, the increased structural forces produced by a carriage 11 oscillating at its natural frequency mean increased deflection of the printer frame 22. Such deflections can be reduced substantially by adding energy absorbing rubber stops (not shown) at the ends of the range of carriage motion. When such stops are added, the amplitude of carriage motion decreases and smooths out. The magnitude of structural deformation caused by carriage displacement can be decreased still further by bracing the oscillating elements, e.g., the frame 22. Contrariwise, a more preferred way of eliminating this problem is to drive the carriage 11 at a speed well below or above its resonance speed. In the latter case the carriage motion versus time curve becomes very straight sided and smooth as illustrated in FIG. 2, without requiring rubber stops or additional bracing.

While gears formed of various materials can be utilized by the invention, preferably, in embodiments of the invention where the gears are directly coupled together dissimilar materials are used. One of the gears can be formed of a delrin (acetal) and the other of 6/6 nylon, for example. This particular material combination is preferred because it has a very low wear factor, whereby embodiments of the invention using gears formed of these materials are operable over an extended period of time. In the case of the belt embodiment of the invention illustrated in FIG. 5, preferably, the belt 51 is formed of Kelvar (Registered Trademark of the E. I. du Pont de Nemours & Co., Wilmington, Del.). In either case, preferably, the elliptical gears are formed so as to have an even number of teeth. An even number of teeth is preferred because such gears are more easy to manufacture than gears having an odd number of teeth, even though gears with an odd number of teeth can be used, if desired. In the belt 51 embodiment of the invention, of course, the belt 51 must have an even number of teeth in order to enable the gears to have and maintain the desired 90° phase relationship. In the case of the belt embodiment, the circumference of the elliptical gears (at the pitch surface) must also be an integer multiple of the belt pitch (distance between the same point on adjacent teeth).

While the eccentric connection point 48a or 48b can be located along either the major or minor axis of the driven bi-lobed gear 45a or 45b for constant velocity shuttling, as best understood greater mechanical advantage results during turn around if the eccentric connection point is located on the minor axis for the gear coupled embodiment and on the major axis for the belt coupled embodiment. In this way the greatest angular velocity change in the carriage driving gear or pulley 45a or 45b occurs during turn around. Increased mechanical advantage is also believed to result in less belt stretch and lower variations in revolutions per minute during a complete rotational cycle of operation.

Figure 8:
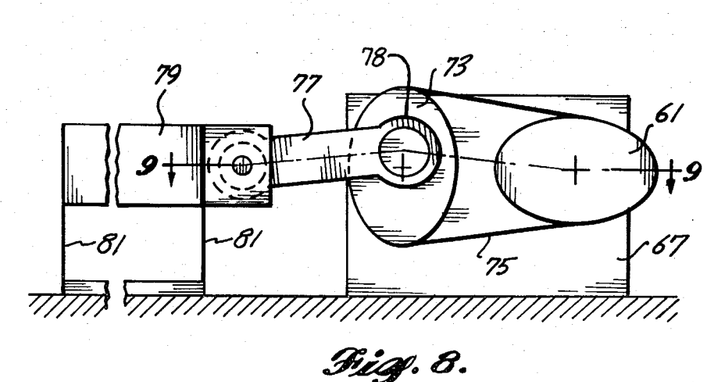
FIG. 8 is an end view of an embodiment of the invention connected to a carriage; and, FIG. 9 is a cross-sectional view of FIG. 8 along line 9—9.
Figure 9:
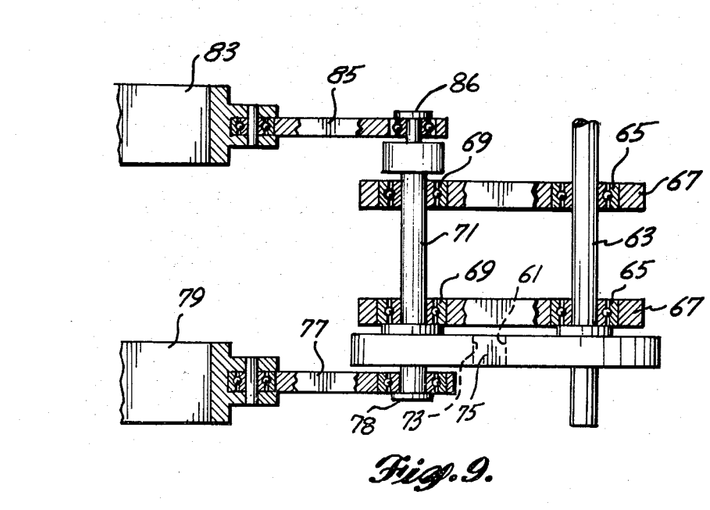

As illustrated in FIG. 3 and noted above, preferably, a bi-directional, constant velocity, carriage shuttling mechanism 31 formed in accordance with the invention includes a compensating mass 49 to reduce the vibration resulting from carriage oscillation. FIGS. 8 and 9 illustrate an alternative mechanism for achieving the same result, i.e., vibration reduction. More specifically, FIGS. 8 and 9 illustrate a first bi-lobed, second order elliptical gear 61 mounted on a first shaft 63 rotated by a constant speed motor (not illustrated in FIGS. 8 and 9). The first shaft 63 is mounted for rotation in bearings 65 supported in frame members 67. The frame members 67 support further bearings 69 that, in turn, support a second shaft 71. The second shaft 71 lies parallel to the first shaft 63. A second bi-lobed, second order elliptical gear 73 sized similar to the first gear 61 is mounted on the second shaft 71 in alignment with the first gear 61. The first and second gears 61 and 73 are connected together by a toothed belt 75. A first connecting link 77, one end of which is eccentrically and rotatably connected to the second gear 73, connects the second gear 73 to one end of a carriage 79. The connection between the first connecting link 77 and the carriage 79 is also rotatable. The carriage 79 is supported by flexures 81.

At this point it will be appreciated that the bi-directional, constant velocity, carriage shuttling mechanism illustrated in FIGS. 8 and 9 is generally similar to the same mechanism 31 illustrated in FIG. 3. However, rather than including a compensating mass 49, the bi-directional, constant velocity, carriage shuttling mechanism illustrated in FIGS. 8 and 9 includes a counter balance carriage 83 that is eccentrically linked by a second connecting link 85 to the second shaft 71. The eccentric point of connection 86 of the second connecting link 85 is rotatable and 180° out-of-phase with the eccentric point of connection 78 between the first connecting link 77 and the second gear 73. Preferably, the counter balance force produced by the counter balance carriage 83 is exactly the same as the force produced by the printer carriage 79. This can be accomplished, for example, by making the mass of the counter balance carriage 83 the same as the mass of the printer carriage 79; making the first and second connecting links 77 and 85 the same length, L; making the eccentric distances, e, the same; and, flexurally supporting the counter balance carriage 83 in the same manner as the printer carriage 79. Alternatively less cumbersome arrangements can be used to produce the same force balance result.

It will be appreciated from the foregoing description that the invention provides a mechanical mechanism for oscillating a carriage. While, preferably, the carriage is supported by flexures, it can be supported by other mechanisms, such as slide support mechanisms (not shown), for example. The invention is adapted to oscillate or shuttle the carriage in a constant velocity manner over a substantial portion of the path of travel of the carriage. As a result, when the invention is used to oscillate the carriage of a printer for example, complex timing mechanisms are not required. That is, because the carriage is linearly moved over the portion of the path of travel during which printing occurs, linear timing can be utilized. At the most only end position synchronizing pulses are required. While either the direct coupling embodiment of the invention (FIG. 4) or the belt coupled embodiment of the invention (FIG. 5) can be utilized in a printer, the belt drive has certain advantages over the gear coupled drive. For example, the belt drive is quieter. In addition, it has greater power transmission capability because the coupling region between the belt and gears is substantially greater than the coupling region between the gears. Moreover, the amount of concentrated stresses are lower. And, two belt coupled gears can be made less precise than finely detailed interconnecting gears.

While preferred embodiments of the invention have been illustrated and described, it will be appreciated that various changes can be made therein without departing from the spirit and scope of the invention. For example, constant velocity oscillating mechanisms formed in accordance with the invention can be positioned other than at the end of the carriage to be oscillated. For example, they can be mounted beneath the carriage and connected to the carriage by any suitable mechanism for converting the rotary output motion of the eccentric point on the second bi-lobed gear into linear motion. Moreover, if desired, rather than a toothed belt, a nontoothed belt can connect nontoothed pulleys, if desired. Of course, such an embodiment of the invention is only adapted to move a relatively lightweight carriage without slip occurring. Alternatively, rather than a toothed or untoothed belt mechanism, the invention, of course, can take the form of a sprocket chain coupling mechanism, which has even greater power transmission capability than a toothed belt pulley mechanism. Consequently, the invention can be practiced otherwise than as specifically described herein.

The embodiments of the invention in which an exclusive property or privilege is claimed are defined as follows:

1. A carriage shuttling mechanism comprising:
    a first bi-lobed, second order elliptical element;
    rotation means connected to said first bi-lobed, second order elliptical element for rotating said first bi-lobed, second order elliptical element at a constant speed;
    a second bi-lobed, second order elliptical element identical in size to said first bi-lobed, second order elliptical element;
    elliptical element connecting means for connecting said first and second bi-lobed, second order elliptical elements together such that said first and second bi-lobed, second order elliptical elements are 90° out-of-phase with one another; and
    eccentric connecting means for eccentrically connecting said second bi-lobed, second order elliptical element to a carriage to be shuttled.

2. The carriage shuttling mechanism claimed in claim 1 wherein said elliptical element connecting means comprises gear teeth formed in the outer periphery of said first and second bi-lobed, second order elliptical elements.

3. The carriage shuttling mechanism claimed in claim 2 wherein said elliptical element connecting means also includes a belt for connecting the gear teeth formed in the outer periphery of said first and second bi-lobed, second order elliptical elements together.

4. The carriage shuttling mechanism claimed in claim 3 wherein said rotation means comprises a constant speed electric motor having a shaft, said first bi-lobed, second order elliptical element being mounted on the shaft of said constant speed electric motor.

5. The carriage shuttling mechanism claimed in claim 4 wherein said eccentric connecting means comprises a link having one end connected to an eccentric point on said second bi-lobed, second order elliptical element and its other end connected to one end of said carriage to be shuttled.

6. The carriage shuttling mechanism claimed in claim 3 wherein said eccentric connecting means comprises a link having one end connected to an eccentric point on said second bi-lobed, second order elliptical element and its other end connected to one end of said carriage to be shuttled.

7. The carriage shuttling mechanism claimed in claim 2 wherein said rotation means comprises a constant speed electric motor having a shaft, said first bi-lobed, second order elliptical element being mounted on the shaft of said constant speed electric motor.

8. The carriage shuttling mechanism claimed in claim 7 wherein said eccentric connecting means comprises a link having one end connected to an eccentric point on said second bi-lobed, second order elliptical element and its other end connected to one end of said carriage to be shuttled.

9. The carriage shuttling mechanism claimed in claim 2 wherein said eccentric connecting means comprises a link having one end connected to an eccentric point on said second bi-lobed, second order elliptical element and its other end connected to one end of said carriage to be shuttled.

10. The carriage shuttling mechanism claimed in claim 1 wherein said rotation means comprises a constant speed electric motor having a shaft said first bi-lobed, second order elliptical element being mounted on the shaft of said constant speed electric motor.

11. The carriage shuttling mechanism claimed in claim 10 wherein said eccentric connecting means comprises a link having one end connected to an eccentric point on said second bi-lobed, second order elliptical element and its other end connected to one end of said carriage to be shuttled.

12. The carriage shuttling mechanism claimed in claim 1 wherein said eccentric connecting means comprises a link having one end connected to an eccentric point on said second bi-lobed, second order elliptical element and its other end connected to one end of said carriage to be shuttled.

13. The carriage shuttling mechanism claimed in claim 1 wherein said elliptical element connecting means includes a belt for connecting said first and second bi-lobed, second order elliptical elements together.

14. The carriage shuttling mechanism claimed in claim 13 wherein said rotation means comprises a constant speed electric motor having a shaft said first bi-lobed, second order elliptical element being mounted on the shaft of said constant speed electric motor.

15. The carriage shuttling mechanism claimed in claim 14 wherein said eccentric connecting means comprises a link having one end connected to an eccentric point on said second bi-lobed, second order elliptical element and its other end connected to one end of said carriage to be shuttled.

16. The carriage shuttling mechanism claimed in claim 13 wherein said eccentric connecting means comprises a link having one end connected to an eccentric point on said second bi-lobed, second order elliptical element and its other end connected to one end of said carriage to be shuttled.

17. In a dot matrix line printer wherein a carriage supports a plurality of dot forming elements arrayed in a line across a print receiving medium, said dot forming elements being selectively actuatable to create image and/or character arrays of dots on said print receiving medium as said print receiving medium is moved through said printer and said carriage is shuttled back and forth, the improvement comprising a bi-directional, constant velocity, carriage shuttling mechanism comprising:
    a first bi-lobed, second order elliptical element;
    rotation means connected to said first bi-lobed, second order elliptical element for rotating said first bi-lobed, second order elliptical element at a constant speed;
    a second bi-lobed, second order elliptical element identical in size to said first bi-lobed, second order elliptical element;

elliptical element connecting means for connecting said first and second bi-lobed, second order elliptical elements together such that said first and second bi-lobed, second order elliptical elements are 90° out-of-phase with respect to one another; and, eccentric connecting means for eccentrically connecting said second bi-lobed, second order elliptical element to the carriage of said dot matrix line printer supporting said dot forming elements.

18. The improvement claimed in claim 17 wherein said elliptical element connecting means comprises gear teeth formed in the outer periphery of said first and second bi-lobed, second order elliptical elements.

19. The improvement claimed in claim 18 wherein said elliptical element connecting means also includes a belt for connecting the gear teeth formed in the outer periphery of said first and second bi-lobed, second order elliptical elements together.

20. The improvement claimed in claim 19 wherein said rotation means comprises a constant speed electric motor having a shaft, said first bi-lobed, second order elliptical element being mounted on the shaft of said constant speed electric motor.

21. The improvement claimed in claim 20 wherein said eccentric connecting means comprises a link having one end connected to an eccentric point on said second bi-lobed, second order elliptical element and its other end connected to one end of said carriage to be shuttled.

22. The improvement claimed in claim 19 wherein said eccentric connecting means comprises a link having one end connected to an eccentric point on said second bi-lobed, second order elliptical element and its other end connected to one end of said carriage to be shuttled.

23. The improvement claimed in claim 18 wherein said rotation means comprises a constant speed electric motor having a shaft, said first bi-lobed, second order elliptical element being mounted on the shaft of said constant speed electric motor.

24. The improvement claimed in claim 23 wherein said eccentric connecting means comprises a link having one end connected to an eccentric point on said second bi-lobed, second order elliptical element and its other end connected to one end of said carriage to be shuttled.

25. The improvement claimed in claim 18 wherein said eccentric connecting means comprises a link having one end connected to an eccentric point on said second bi-lobed, second order elliptical element and its other end connected to one end of said carriage to be shuttled.

26. The improvement claimed in claim 17 wherein said rotation means comprises a constant speed electric motor having a shaft, said first bi-lobed, second order elliptical element being mounted on the shaft of said constant speed electric motor.

27. The improvement claimed in claim 26 wherein said eccentric connecting means comprises a link having one end connected to an eccentric point on said second bi-lobed, second order elliptical element and its other end connected to one end of said carriage to be shuttled.

28. The improvement claimed in claim 17 wherein said eccentric connecting means comprises a link having one end connected to an eccentric point on said second bi-lobed, second order elliptical element and its other end connected to one end of said carriage to be shuttled.

29. The improvement claimed in claim 17 wherein said elliptical element connecting means includes a belt for connecting said first and second bi-lobed, second order elliptical elements together.

30. The improvement claimed in claim 29 wherein said rotation means comprises a constant speed electric motor having a shaft, said first bi-lobed, second order elliptical element being mounted on the shaft of said constant speed electric motor.

31. The improvement claimed in claim 30 wherein said eccentric connecting means comprises a link having one end connected to an eccentric point on said second bi-lobed, second order elliptical element and its other end connected to one end of said carriage to be shuttled.

32. The improvement claimed in claim 29 wherein said eccentric connecting means comprises a link having one end connected to an eccentric point on said second bi-lobed, second order elliptical element and its other end connected to one end of said carriage to be shuttled.

* * * * *